United States Patent [19]

Mignolet

[11] 4,376,292

[45] Mar. 8, 1983

[54] APPARATUS FOR ERASING AND REPRODUCING AUDIO SIGNALS

[75] Inventor: Georges M. A. Mignolet, Eindhoven, Netherlands

[73] Assignee: U.S. Philips Corporation, New York, N.Y.

[21] Appl. No.: 161,960

[22] Filed: Jun. 23, 1980

[30] Foreign Application Priority Data

Jul. 3, 1979 [NL] Netherlands .......................... 7905160

[51] Int. Cl.³ .............................................. G11B 5/47
[52] U.S. Cl. ....................................................... 360/66
[58] Field of Search .................................... 360/66, 13

[56] References Cited

U.S. PATENT DOCUMENTS

| | | | |
|---|---|---|---|
| 2,962,560 | 11/1960 | Folse | 360/66 |
| 3,038,036 | 6/1962 | Young et al. | 360/66 |
| 3,156,784 | 11/1964 | Kump | 360/66 |

Primary Examiner—Vincent P. Canney
Attorney, Agent, or Firm—Joseph P. Abate

[57] ABSTRACT

A passage of a previously recorded audio signal is erased from a magnetic tape such that a substantially linear decrease or increase of the sound level is perceived by the operator when the signal is reproduced by a reproducing head. The erase current is increased as a function of time from a minimum to a maximum amplitude, sequentially, through three ranges, and decreased in reverse order. The slopes of current versus time within the first and third ranges have a value substantially greater than the slope within the second range.

13 Claims, 5 Drawing Figures

APPARATUS FOR ERASING AND REPRODUCING AUDIO SIGNALS

BACKGROUND OF THE INVENTION

The invention relates to an apparatus erasing and for reproducing audio signals from a magnetic record medium, such as magnetic tape. The apparatus comprises a head for reproducing signals, a head for erasing signals, and an erase-current generator which, after switching on, applies to the erasing head an erase current whose amplitude increases as a function of time and, after switching off, applies to the erasing head an erase current whose amplitude decreases as a function of time.

The apparatus may be employed in cassette tape recorders in order to erase undesired passages of a previously recorded audio signal during reproduction or while editing the tape. The effect of the erasure therefore, can be monitored soon after erasure. To ensure that the remaining passages do not end or begin abruptly, the erase current increases or decreases respectively as a function of time.

SUMMARY OF THE INVENTION

It is the object of the invention to ensure that, upon reproduction of an audio signal erased by the present apparatus, the sound level is perceived by the operator as varying as a substantially linear function of time.

Accordingly, the invention includes means for producing an erase current whose amplitude, after switching on, increases from a minimum to a maximum amplitude sequentially through a first range, a second range, and a third range and, after switching off, decreases through the ranges in reverse order. In each of the three ranges the current has a respective slope as a function of time, which slope is determined primarily by respective first, second and third time constants. The values of the first and the third constants are each selected substantially greater than the value of the second constant and at least the boundary between the first and the second ranges as well as the ratio of the values of the first and the second constants selected such that, upon reproduction of an audio signal erased in accordance with the invention, the amplitude of the reproduced signal varies substantially in accordance with a single logarithmic function of time.

The invention is based on the recognition that when the first constant is substantially greater than the second constant, the erase effect as a function of the erase current varies so that a logarithmic relationship between the erase effect and time is obtained during the first and the second ranges. This relationship causes the sound level expressed in dB's to vary as a substantially linear function of time. Further, increasing the value of the third constant and, therefore, the slope in the third range, permits rapid erasure of any residual signal. The linear variation of the sound level and the rapid erasure of any residual signal are not easily realized if an erase current varies as a totally linear function of time. The increase of the slope in the third range is especially important when erasing metal-powder tapes, because of the tapes' high coercivity. The present invention provides simple means for realizing an erase current whose amplitude has a respective slope as a function of time in each of three sequential ranges.

A preferred embodiment of the apparatus in accordance with the invention is characterized in that the erase current generator includes means for generating a control signal which is applied to an integrator for integrating the control signal; a signal-dependent network connected to the integrator for defining the integration constant such that the integrator output signal corresponds to the three ranges and exhibits three slopes corresponding to the three constants; and an oscillator circuit associated with the integrator for supplying to the erasing head the erase current whose amplitude is controlled by the integrator output signal.

This preferred embodiment further is characterized in that the integrator includes an amplifier having negative feedback between the amplifier and output and input circuits. The feedback is provided by the series connection of a resistor and a capacitor; the point between the resistor and capacitor being connected through a first and a second diode to a resistive network which is connected across a direct voltage source. The resistive network is arranged such that, during the first range, the first diode is conductive and the second diode is non-conductive during the second range, the first and the second diodes are non-conductive; and during third range, the second diode is conductive and the first diode is non-conductive.

Further, the control signal generator of the preferred embodiment is characterized in that it includes a charging resistor included in the input circuit of the amplifier, a direct-voltage source having both negative and positive polarity, and a control switch having first and second positions for connecting the source through the charging resistor to the amplifier.

An alternate embodiment of the erase current generator is characterized in that the amplifier includes an input transistor connected in a common-emitter arrangement. Therefore, the emitter electrode is connected to a common point. The base electrode of the input transistor is connected to its emitter electrode through the charging resistor and the switch. A source of potential includes a connection between a resistive divider network and a point between the switch and the charging resistor. A series connection of two diodes is connected in parallel with the switch such that the diodes are conductive when the switch is open.

In order to adjust simply the slope of the erase-current amplitude in each of the three ranges without affecting the shape of the current amplitude versus time characteristic, the charging resistor is a variable resistor.

BRIEF DESCRIPTION OF THE DRAWINGS

The invention will be described in more detail with reference to the accompanying drawings, in which.

DESCRIPTION OF THE PREFERRED EMBODIMENTS

Figure 1:
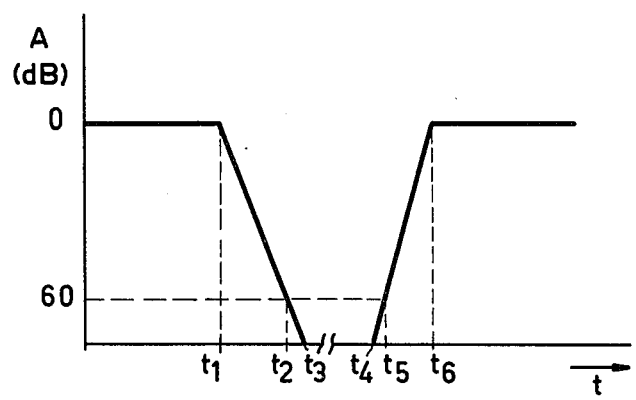
FIG. 1 is a graphical representation of the desired erase effect A as a function of the time t.

FIG. 1 displays the desired variation of the erase effect A as a function of the time t when erasing, pursuant to the invention, a passage from a magnetic tape. Until the instant $t_1$, the recorded audio signal is not subject to the erase effect (A=0 dB). At the instant $t_1$, a passage is to be erased. In accordance with the invention, the level of the reproduced signal decreases as a logarithmic function of time, because the operator will perceive such a logarithmic decrease as a substantially linear decrease. To this end, therefore, the erase effect A expressed in dB's increases as a linear function of time. At the instant $t_2$, the erase effect has increased to a specific limit, for example 60 dB, at which limit the reproduced signal has decreased to the level of the background noise present on the tape. The erase effect then is increased until the instant $t_3$, because audio signal levels of the same order of magnitude as the noise level are still perceived as annoying by the operator. Between the instants $t_4$ and $t_6$, the erase effect decreases in a reverse manner.

Figure 2:
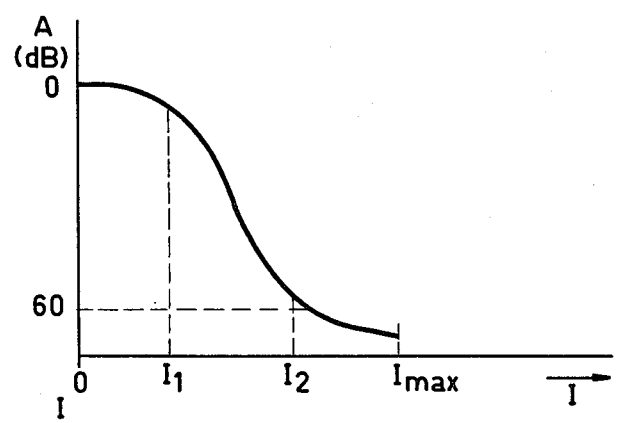
FIG. 2 is a graphical representation of the erase effect A as a function of the amplitude I of the erase current.

FIG. 2 is a graphical representation of the erase effect A, expressed in dB's, as a function of the amplitude I of the erase current applied to the erase head. During a first range, $O < I < I_1$, the erase effect A is very weak and increases slowly with the amplitude I of the erase current. During a second range, $I_1 < I < I_2$, the erase effect A increases rapidly with the increasing amplitude I of the erase current, and during a third, range $I_2 < I < I_{max}$, the erase effect A again increases very slowly with the amplitude I of the erase current. The boundary $I_2$, between the second and the third ranges therefore, situated near the value of the erase-current amplitude I at which the nominal signal level has been erased to the noise level.

Figure 3:
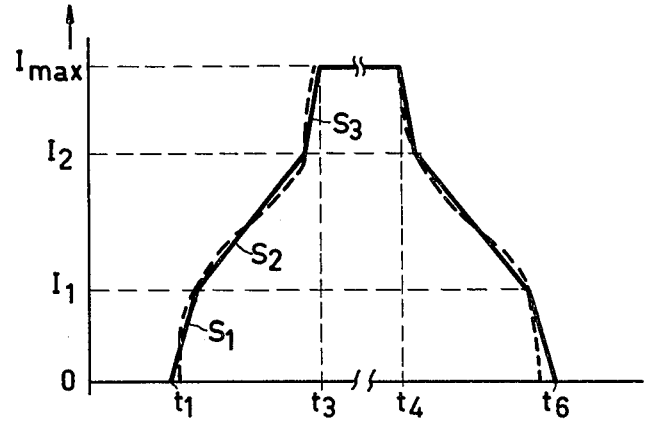
FIG. 3 is a graphical representation of the desired variation of the amplitude I of the erase current as a function of time t.

FIG. 3 is a graphical representation of the desired variation of the amplitude I of the erase current as a function of time in order to obtain the erase effect displayed in FIG. 1. Between the instants $t_1$ and $t_3$, the amplitude I of the erase current is increased from a minimum O to a maximum $I_{max}$ in accordance with the dashed curve. Between the instants $t_4$ and $t_6$, the amplitude I of the erase current is decreased from the maximum to the minimum amplitude in the reverse manner. As is represented by the solid line curve in FIG. 3, the desired amplitude I of the erase current as a function of time can be approximated satisfactorily by a function which exhibits a slope $S_1$, $S_2$ and $S_3$, respectively, in each of the three ranges, $O < I < I_1$, $I_1 < I < I_2$ and $I_2 < I < I_{max}$; $S_1$ and $S_3$ each being substantially greater than the slope $S_2$. A current which exhibits different slopes in the three amplitude ranges, can be generated simply.

Figure 4:
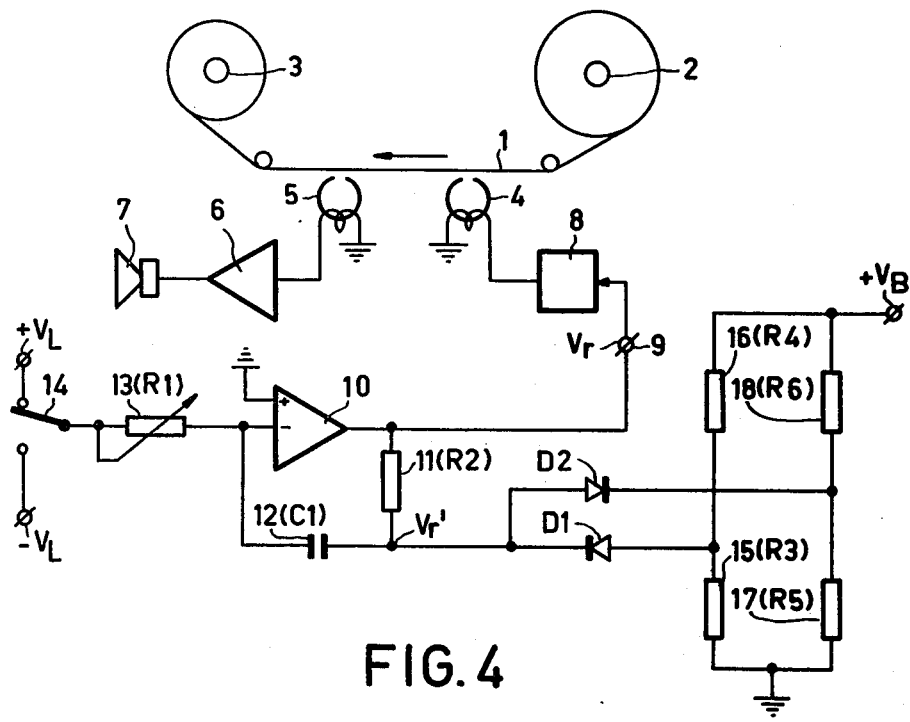
FIG. 4 is a schematic circuit diagram of a preferred embodiment of an apparatus in accordance with the invention.

FIG. 4 displays a schematic circuit diagram of a preferred embodiment of an apparatus in accordance with the invention. The apparatus winds a magnetic tape 1 from a supply reel 2 onto a take-up reel 3 in the direction of the arrow. The tape 1, therefore passes along an erase head 4 and then a reproducing head 5 which are included in the apparatus. The reproducing head 5 supplies the audio signals to a loudspeaker 7 which is connected to a playback amplifier 6. The erase head 4 receives an erase current from an erase-current oscillator 8 having an input point 9. The voltage $V_r$ appearing at the input point 9 controls the amplitude of the erase current supplied to the head 4. A substantially linear relationship between the voltage $V_r$ and the amplitude I of the erase current is assumed and is realized, for example, by means of an oscillator which is driven by the voltage $V_r$.

For generating the desired time-dependent amplitude of the erase current, the voltage $V_r$ is generated by an integrator. The integrator includes an operational amplifier 10 which has an input circuit and an output circuit. A resistor 11 having a resistance $R_2$ and a capacitor 12 having a capacitance $C_1$ are series connected between the amplifier input and output circuits such that the series connection provides negative feedback to the amplifier 10. The input circuit of the operational amplifier 10 is connected to a control switch 14 through a variable resistor 13 having a variable resistance $R_1$. Switch 14 has a first position and a second position and connects the variable resistor 13 to a direct voltage source which has both negative and positive polarity nodes. Switch 14, therefore, applies to resistor 13 either a negative $(-V_L)$ or a positive $(+V_L)$ input voltage relative to the input level (ground) of the amplifier 10, respectively, in the first or the second position of the switch 14.

When switch 14 is switched from $+V_L$ to $V_L$ a current having an absolute value $V_L/R_1$ will flow through resistor $R_1$, which current, through a capacitor 12 and a resistor 11, flows to the point 9. The voltage $V_r$ is then:

$$V_r = V_{to} + \frac{V_L}{R_1 C_1} t$$

$V_{to}$ is the initial condition voltage. Therefore, the slope $S_2$ during the second range, $I_1 < I < I_2$, is:

$$S_2 = \frac{V_L}{R_1 C_1}$$

(1)

In order to increase the slopes in the other two ranges, a voltage divider network for generating reference voltages is utilized. The point between the resistor 11 and the capacitor 12 is connected through a diode D1 to a point between the series connection of resistor 15 (having the resistance $R_3$) and resistor 16 (having the resistance $R_4$). Further, the point between the resistor 11 and the capacitor 12 is connected through a diode D2, with a polarity opposite to that of the diode D1, to a point between the series connection of resistor 17 (having a resistance $R_5$) and resistor 18 (having a resistance $R_6$). The resistors 15, 16, 17, 18 are coupled to a supply voltage $+V_B$ and to ground, thereby constituting two voltage dividers.

Regarding the voltage $V_r^1$ appearing at the point between the resistor 11 and the capacitor 12, which voltage relative to the voltage $V_r$ has a potential difference equal to $$+ \frac{R_2}{R_1} V_L$$

(switch 14 to $-V_L$) or $$- \frac{R_2}{R_1} V_L$$

(switch 14 to $+V_L$), three ranges are distinguished:

a first range wherein diode D1 conducts, which range is bounded by the voltages $$V_r^1 = \frac{R_3}{R_3 + R_4} V_B \text{ and } V_r^1 = oV;$$

a second range wherein neither of the two diodes D1 and D2 conducts $$\left( \text{provided that } \frac{R_3}{R_3 + R_4} < \frac{R_5}{R_5 + R_6} \right),$$

which second range is bounded by the voltages $$V_r^1 = \frac{R_3}{R_3 + R_4} V_B \text{ and } V_r^1 = \frac{R_5}{R_5 + R_6} V_B;$$

and a third range wherein diode D2 conducts, which range is bounded by the voltages $$V_r^1 = \frac{R_5}{R_5 + R_6} V_B \text{ and } V_r^1 = V_B.$$

In the first range, the slope $S_1$, which represents the relationship between the voltage $V_r$ and time, is found to be:

$$S_1 = S_2 \left( 1 + \frac{R_2(R_3 + R_4)}{R_3 R_4} \right),$$

in which $S_2$ is given by the previous expression (1).

In the second range, the slope $S_2$ which was previously discussed is valid; See expression (1).

In the third range, the slope $S_3$ is found to be:

$$S_3 = S_2 \left( 1 + \frac{R_2(R_5 + R_6)}{R_5 R_6} \right).$$

The boundaries, $$\frac{R_3}{R_3 + R_4} V_B \text{ and } \frac{R_5}{R_5 + R_6} V_B$$

between the three ranges can be selected so that, by a suitable choice of the resistance values $R_3$, $R_4$, $R_5$ and $R_6$, they correspond to the boundary values $I_1$ and $I_2$ of the amplitude of the erase current generated by the oscillator 8.

Because the diodes D1 and D2 are not ideal switches, there will be a gradual transition between the ranges. This transition is a favorable effect, because the amplitude I of the erase current as a function of time then better approximates the dashed curve displayed in FIG. 3.

When switch 14 is switched to the voltage $+V_L$, the voltage $V_r$ then decreases as a function of time. However, because the current through resistor 11 is now reversed, the boundaries $I_1$ and $I_2$ will be situated in time somewhat differently. Specifically, the two voltage dividers determine the cross-over points in the variation of the voltage $V_r^1$ as a function of time which points correspond to the cross-over points in variation of the voltage $V_r$ as a function of time if the voltage drop across resistor 11 is ignored. The polarity of the voltage drop depends upon the position of switch 14.

The voltage drop across resistor 11 is $$\pm \frac{R_2}{R_1} V_L$$

and the difference in the voltage $V_r$ from the voltage $V_r^1$ through both positions of the switch 14 is then $$2 \frac{R_2}{R_1} V_L.$$

Figure 5:
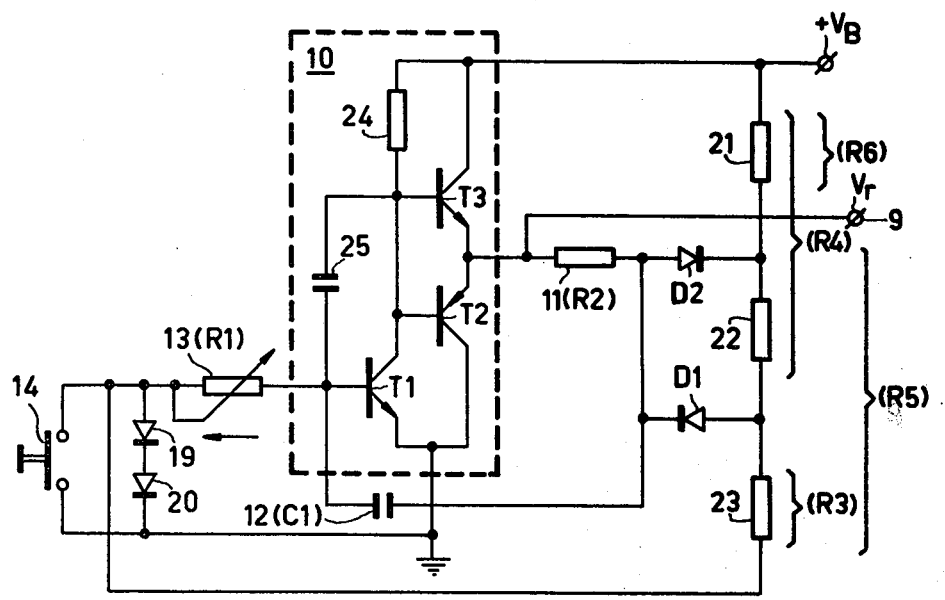
FIG. 5 is a schematic circuit diagram of an alternative embodiment of the circuit for generating the voltage Vr in the apparatus of FIG. 4.

FIG. 5 displays an alternative embodiment of the circuit for generating the voltage $V_r$ in the apparatus displayed in FIG. 4. The amplifier 10 includes an input transistor $T_1$ and transistors $T_2$ and $T_3$ in addition to a resistor 24 coupled to a capacitor 25. Switch 14 now has a first terminal connected to ground and a second terminal connected to the variable resistor 13 which is coupled to the base of the transistor $T_1$. Diodes 19 and 20 are series connected and in parallel with the switch 14. The two voltage dividers (resistors 15, 16, 17, 10 in FIG. 4) are now constituted by three series-connected resistors 21, 22 and 23, which are connected between the supply voltage $+V_B$ and the point between resistor 13 and the second terminal switch 14. Thus, the resistance values $R_3$, $R_4$, $R_5$ and $R_6$ discussed in connection with the circuit of FIG. 4 correspond, respectively, to the resistance values of resistor 23, the series connection of resistor 21 with resistor 22, the series connection of resistor 22 with resistor 23, and resistor 21.

The voltage on the base of transistor $T_1$ is equal to one diode voltage relative to ground. When switch 14 is closed a voltage equal to one diode voltage $V_d$ appears across resistor 13 in the direction of the arrow near resistor 13; when switch 14 is opened one diode voltage $V_d$ appears in the opposite direction. Therefore, when the switch 14 is closed, input transistor $T_1$ is cut off and the voltage $V_r$ increases as a function of time; when the switch 14 is opened, transistor $T_1$ is turned on and the voltage $V_r$ decreases as a function of time. Thus, in the circuit of FIG. 5, the function of the voltage $V_d$ corresponds closely to that of the voltage $V_L$ in FIG. 4.

Because of the circuit arrangement in accordance with FIG. 5, the voltage on the ground side of resistor 23 will change by two diode voltages, 2 $V_d$, when switch 14 is switched. This results in voltage transients at the points of the voltage divider connected to the diodes D1 and D2. These voltage transients can fully or partly compensate for the voltage transient previously mentioned with reference to FIG. 4.

The remainder of the operation of the circuit of FIG. 5 is identical to that of FIG. 4.

The circuit in accordance with FIG. 5 may be realized, for example with the following circuit parameters:
resistor 13: 47 kΩ — 1MΩ variable
resistor 11: 10 kΩ
resistor 23: 680 Ω
resistor 22: 1.2 kΩ
resistor 21: 2.7 kΩ
capacitor 12: 470 nF
$V_d$: 0.6 V.
$V_B$: 15 V.

These parameters yield the following values of the slopes, $S_1$, $S_2$ and $S_3$:

$S_1$: 18.2 $S_2$
$S_2$: (1.3−27.1) V/s
$S_3$: 10 $S_2$

Resistor 13 is variable, therefore the slope $S_2$ is variable and so are the slopes $S_1$ and $S_3$, but their mutual ratios will not change. The duration of the increase or decrease of the amplitude I of the erase current is adjustable without changing the shape of the current amplitude versus time characteristic.

What is claimed is:

1. An apparatus for reproducing audio signals recorded on a magnetic recording medium, which comprises:
   a head for reproducing the audio signals;
   a head for erasing the audio signals;
   means associated with said erasing head for providing relative motion of the medium past said erasing head, and
   erase current generator means electrically connected to said erasing head for applying an erase current to said erasing head, said generator means including means for switching said generator means on and off such that, after switching on, said generator means applies to said erasing head a current whose amplitude increases as a first function of time and, after switching off, applies to said erasing head a current whose amplitude decreases as a second function of time, at least one of said functions of time having first, second and third sequential ranges, in each of said ranges the current having a respective slope as a function of time, which slope is determined primarily by respective first, second and third time constants, said first and third time constants each being substantially greater than the second time constant.

2. An apparatus as claimed in claim 1, wherein at least the boundary between the first and second ranges as well as the ratio of the values of the first and second constants are selected such that, upon reproduction of an audio signal erased by said generator means, the amplitude of the reproduced signal varies substantially in accordance with a single logarithmic function of time.

3. A device for erasing a passage of audio signals recorded on a magnetic recording medium, which comprises:
   a head for erasing the audio signals;
   means associated with said erasing head for providing relative motion of the medium past said erasing head, and
   erase current generator means electrically connected to said erasing head for applying an erase current to said erasing head, said generator means including means for switching said generator means on and off such that, after switching on, said generator means applies to said erasing head a current whose amplitude increases as a function of time and, after switching off, applies to said erasing head a current whose amplitude decreases as a function of time,
   characterized in that said generator means includes means for producing an erase current whose amplitude, after switching on,
   (1) increases from a minimum to a maximum amplitude sequentially through a first range, a second range and a third range and,
   (2) after switching off, decreases through said ranges in reverse order from the maximum to the minimum amplitude,
   (3) has a slope as a function of time, which slope, in said first range, is determined primarily by a first constant; in said second range, is determined primarily by a second constant; in said third range, is determined primarily by a third constant;
   (4) the first and third constants each have a value substantially greater than the second constant.

4. A device as claimed in claim 3, wherein at least the boundary between the first and the second ranges as well as the ratio of the values of the first and the second constants being selected such that, upon reproduction of an audio signal erased by said generator means, the amplitude of the reproduced signal varies substantially in accordance with a single logarithmic function of time.

5. A device as claimed in claims 3 or 4, wherein said ranges are ranges of current.

6. A device as claimed in claims 3 or 4, wherein said switching means includes means for generating a control signal and said current producing means includes:
   an integrator electrically connected to said control means, for integrating the control signal supplied by said control means and for producing a time dependent output signal;
   a signal-dependent network electrically connected to said integrator for defining the integration constant of said integrator such that the integrator output signal corresponds to said first, second and third ranges, and
   an oscillator associated with said integrator and with said erasing head for applying to said erasing head the erase current whose amplitude is controlled by the integrator output signal.

7. A device as claimed in claim 6, wherein said integrator includes an amplifier having an output circuit and an input circuit, and feedback means for providing negative feedback to said amplifier, said feedback means includes a resistor and a capacitor connected in series between said amplifier output circuit and said input circuit, and said signal-dependent network includes:
   a first diode and a second diode;
   means for connecting said first diode to said feedback means;
   means for connecting said second diode with opposite polarity to said feedback means, and
   a resistive network for generating reference voltages coupled to said first and to said second diodes.

8. A device as claimed in claim 7, wherein said resistive network is arranged such that, during said first range, said first diode is conductive and said second diode is non-conductive; during said second range, said first and said second diodes are non-conductive; and during said third range, said second diode is conductive and said first diode is non-conductive.

9. A device as claimed in claim 8, wherein said control means comprises:
   a charging resistor having a first end coupled to said amplifier input circuit, and a second end;
   a direct current voltage source having both negative and positive polarity nodes, and
   a control switch coupled to said source nodes and to said amplifier, said switch having at least a first position and a second position such that said switch connects said amplifier to the negative and positive polarity nodes, respectively, in the first and the second positions of said switch.

10. A device as claimed in claim 8, wherein said amplifier includes an input transistor having an emitter electrode connected to a common point and having a base electrode connected to said amplifier input circuit, and said control means comprises:
- a control switch having a first terminal connected to ground, and a second terminal;
- a source of potential of a polarity which, when applied to the base of said input transistor, causes said transistor to conduct, said source being connected to said second terminal, and
- a charging resistor connected between said second terminal and the amplifier input circuit.

11. A device as claimed in claim 10, wherein said source of potential comprises a connection between said resistive network and said second terminal, and at least one diode connected in parallel with said switch and of a polarity such that the diode is conductive when said switch is open.

12. A device as claimed in claims 9 or 11, wherein said charging resistor is a variable resistor.

13. An apparatus for reproducing audio signals recorded on a magnetic recording medium, which comprises:
- a head for reproducing the audio signals;
- a head for erasing the audio signals
- means associated with said erasing head for providing relative motion of the medium past said erasing head, and
- erase current generator means electrically connected to said erasing head for applying an erase current to said erasing head, said generator means including means for switching said generator means on and off such that, after switching on, said generator means applies to said erasing head a current whose amplitude increases as a function of time and, after switching off, applies to said erasing head a current whose amplitude decreases as a function of time, characterized in that said generator means includes means for producing an erase current whose amplitude, after switching on,
  (1) increases from a minimum to a maximum amplitude sequentially through a first range, a second range and a third range and,
  (2) after switching off, decreases through said ranges in reverse order from the maximum to the minimum amplitude,
  (3) has a slope as a function of time, which slope, in said first range, is determined primarily by a first constant; in said second range, is determined primarily by a second constant; in said third range, is determined primarily by a third constant;
  (4) the first and third constants each have a value substantially greater than the second constant, at least the boundary between the first and the second ranges as well as the ratio of the values of the first and the second constants being selected such that, upon reproduction of an audio signal erased by said generator means, the amplitude of the reproduced signal varies substantially in accordance with a single logarithmic function of time.

* * * * *